July 23, 1957  D. A. GARRETT  2,800,188
CONVERSION OF CRAWLER-TYPE TRACTOR TO WHEELED TRACTION
Filed July 20, 1953  2 Sheets-Sheet 1

INVENTOR.
Dwight A. Garrett
BY

July 23, 1957  D. A. GARRETT  2,800,188
CONVERSION OF CRAWLER-TYPE TRACTOR TO WHEELED TRACTION
Filed July 20, 1953  2 Sheets-Sheet 2
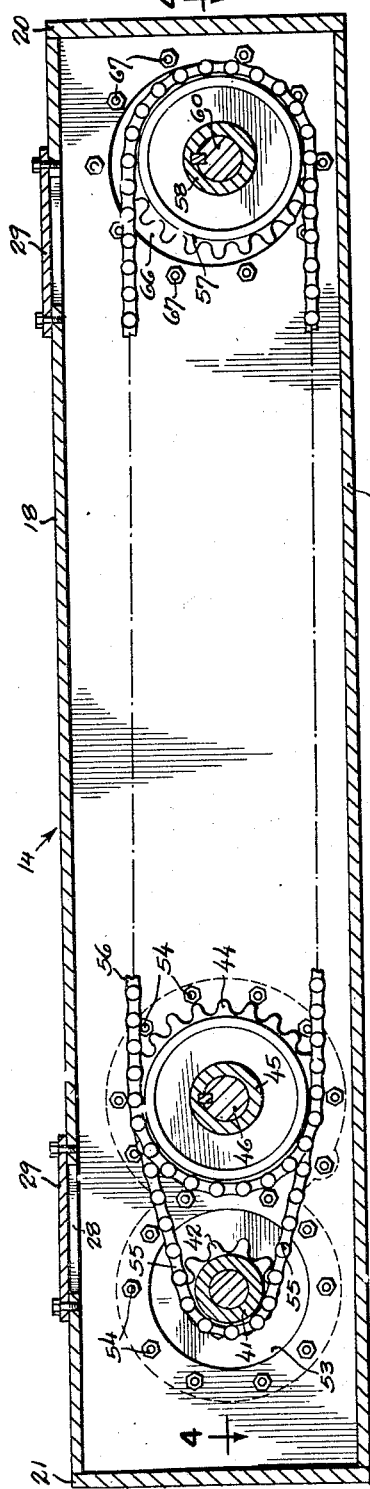
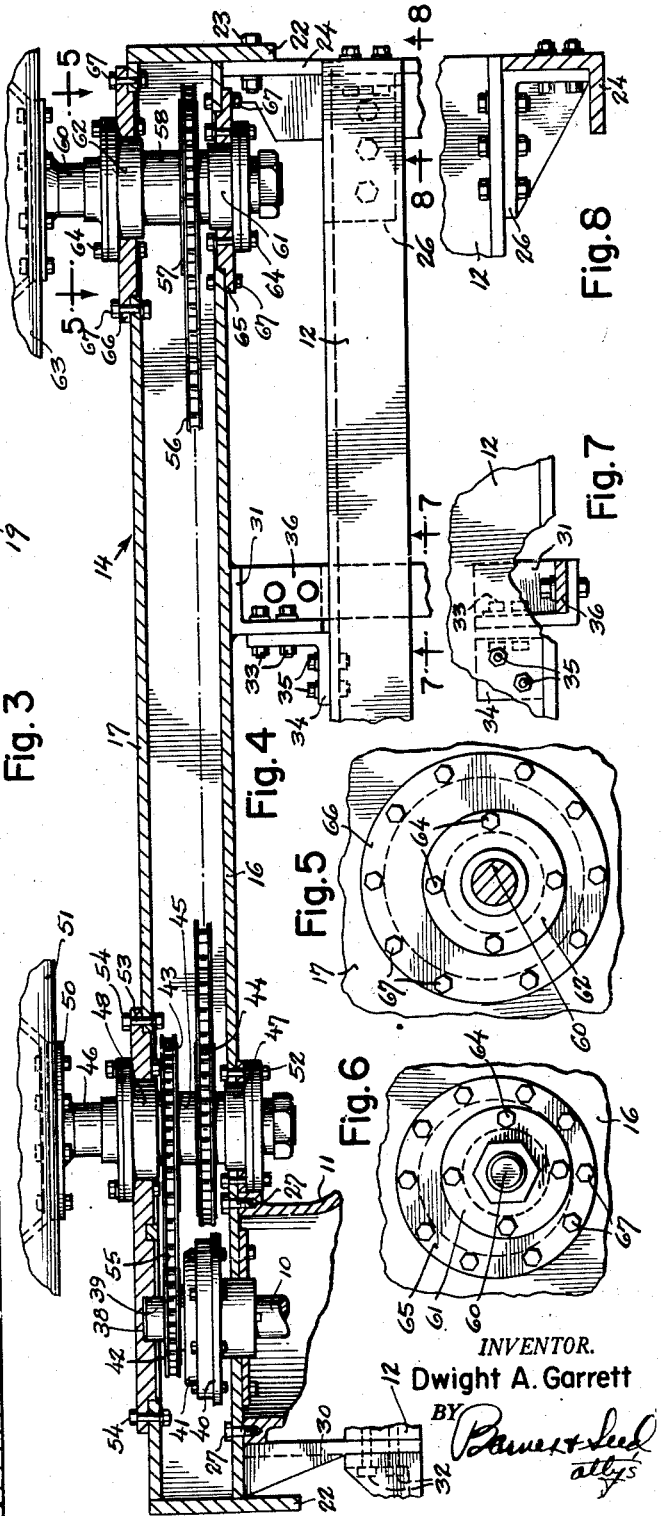
INVENTOR.
Dwight A. Garrett

United States Patent Office 2,800,188
Patented July 23, 1957

2,800,188

CONVERSION OF CRAWLER-TYPE TRACTOR TO WHEELED TRACTION

Dwight A. Garrett, Enumclaw, Wash.

Application July 20, 1953, Serial No. 369,046

7 Claims. (Cl. 180—6.2)

This invention relates to tractors, and for its general object aims to provide means by which tractors expressly designed to function as a track-laying or crawler type of tractor may, with comparative ease and at a nominal expense, be converted to a wheeled tractor, and wherein the conversion in no way alters the basic structure of the tractor and thus enables the machine to be again easily and expeditiously converted to a crawler type tractor should the desire or a need therefor later arise.

Prior to the present invention manufacturers of tractors have produced either a line of crawler tractors, a line of wheeled tractors, or both, but they have not produced a line of tractors which could be considered multi-duty in the sense that a purchaser, with no change in the basic structure of the machine, can have the same equipped either for crawler traction or wheel traction. It has been heretofore commonly accepted that the central frame, the transmission and drive lay-out, and the mechanisms for steering must be each specially constructed to meet differing requirements as between a wheeled tractor and a crawler tractor. By the teachings of the present invention it becomes possible to use the same central frame, the same transmission, and the same means of steering when making a conversion from a crawler type to a wheeled type of tractor, the arrangement being one in which there is employed, in lieu of the swing frames which carry the crawler belts, a pair of chain cases and within each of these chain cases providing drive chains passing power from the tractor's transmission both to a front and a rear traction wheel each receiving its journal mounting from the chain case.

Specific objects of the invention will appear and be understood in the course of the following description and claims, the invention consisting in the novel construction and in the adaptation and combination of parts hereinafter described and claimed.

In the accompanying drawings:

Fig. 3 is a longitudinal vertical sectional view drawn to an enlarged scale on line 3—3 of Fig. 1 with the wheels deleted.

Fig. 4 is a fragmentary horizontal sectional view drawn on line 4—4 of Fig. 3.

Fig. 5 is a fragmentary longitudinal vertical sectional view on line 5—5 of Fig. 4 to show one of the two mounting plates which carry journal boxes for the converted tractor's front-wheel axle.

Fig. 6 is a fragmentary elevational view looking from the opposite side of the concerned chain case to show the other mounting plate for said front-wheel axle.

Fig. 7 is a fragmentary longitudinal vertical sectional view drawn on line 7—7 of Fig. 4; and Fig. 8 is a fragmentary longitudinal vertical sectional view drawn on line 8—8 of Fig. 4.

Figure 1:
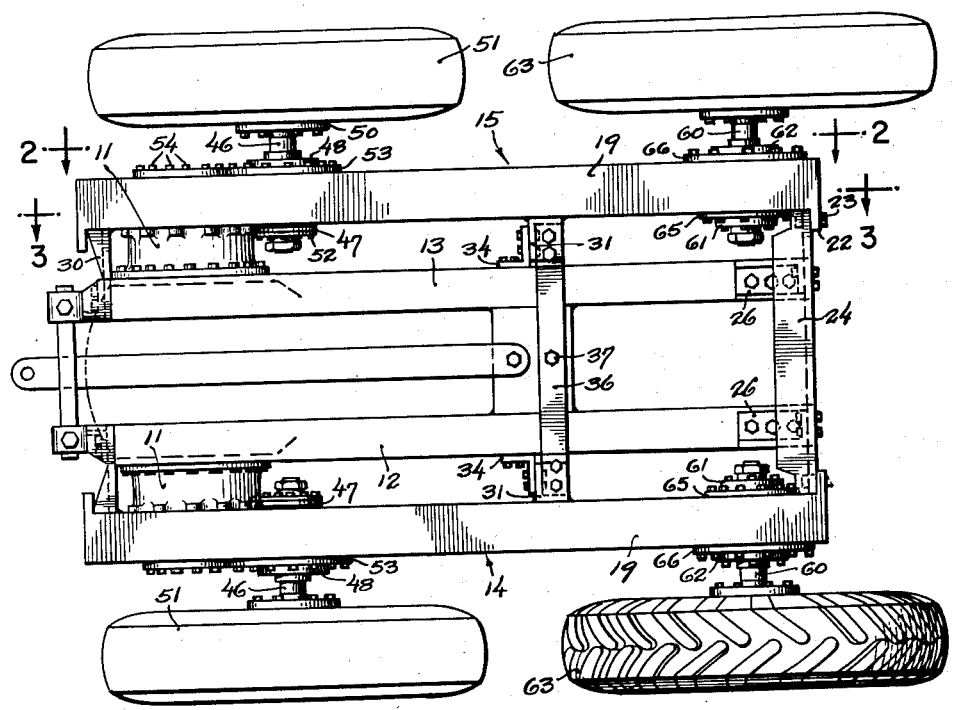
Figure 1 is a fragmentary underside plan view of a tractor having its central frame, transmission and steering controls engineered in accordance with standard crawler-tractor practice, and shown converted to a wheeled tractor in accordance with the preferred teachings of the present invention.
Figure 2:
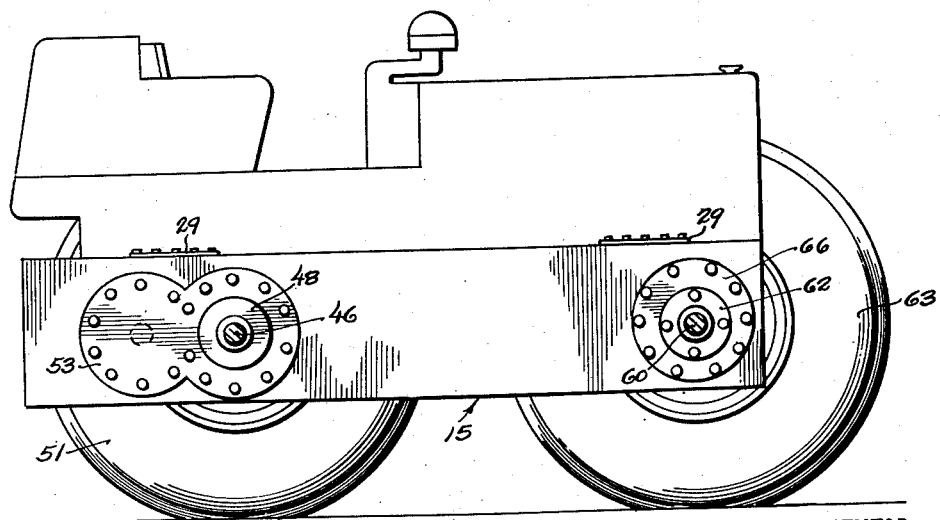
Fig. 2 is a longitudinal vertical section on line 2—2 of Fig. 1.

The only parts of a standard crawler-type tractor which are shown in Fig. 1 of the drawing are framing members and the housing extensions lying outside the frame at each side of the latter and through which power is passed by coaxial stub driving shafts to outlying driver wheels. In crawler practice there are customarily provided, at each side of the tractor, a respective swing frame admitting to restrained pivotal movement about a transverse horizontal axis. The crawler belts, one at each side of the tractor, are trained about said driver wheels and complementing idler wheels carried at the front ends of the respective swing frames. The stub shafts are each independently clutch and brake controlled so as, by selective clutching and declutching, to steer the tractor.

In performing a conversion in accordance with the teachings of the present invention the driven wheels and the swing frames are removed. The stub drive shafts, designated by the numeral 10, the lateral housing extensions 11, and the existing controls for the stub drive shafts are all retained. Substituting for the swing frames but distinguished therefrom in that the same are made secure to the tractor's longitudinal framing principals 12 and 13 are chain cases 14 and 15 formed to a substantial box configuration rectangular in section and fabricated, by preference, from plate stock integrated by welding. The inside and outside walls of the chain cases are designated by 16 and 17, respectively, the top and bottom walls by 18 and 19, respectively, and the front end walls by 20 and 21, respectively. The end walls each present a lip prolongation 22 projecting inwardly beyond the inside wall 16, and drilled through such prolongations at spaced intervals of the height are bolt-holes serving, in the instance of the front-wall prolongations, to receive bolts 23 for the secure attachment of a bar 24 spanning the converted tractor from the chain case at one side to the chain case at the other side of the tractor. This bar is by preference made from angle stock and is rigidly secured to the tractor's longitudinal framing principals 12 and 13 by gusseted angle-brackets 26, see Figs. 1, 4 and 8. The rear-wall prolongation serves no particular purpose insofar as the making of the conversion is concerned, being provided only as a means of mounting accessory equipment such, for example, as a cable drum (not shown).

The rear portions of the chain cases bear against the housing extensions 11 and are secured thereto by cap-screws 27, with access to the interior of the respective chain case for application of these cap-screws being obtained through ceiling openings 28 normally closed by cover plates 29. Two additional brackets 30 and 31, each welded to the inside wall 16 of the chain case, augment the bar 24 in securing each chain case rigidly to the tractor's main frame. The former of these brackets lies to the immediate rear of the related housing extension 11 and connects with the frame by bolts 32. The other bracket 31 lies intermediate the length of the chain case and is bolted, as at 33, to a complementing bracket 34 which is bolted in turn, as at 35, to the main frame. A cross-bar 36 extends below the frame from the bracket 31 at one side to the bracket 31 at the other side of the vehicle, and intermediate its length this bar is also bolted, as at 37, to the vehicle frame.

Within each chain case the related stub shaft has a flanged wheel 40 keyed thereto, and there is bolted to the flange of this wheel a hub 41 carrying a sprocket wheel 42. To the immediate front of this sprocket wheel are two co-axial sprocket wheels 43 and 44, and carrying these sprocket wheels is a common hub 45 keyed or otherwise made fast to a rear axle 46, the axle receiving its journal from bearing boxes 47 and 48 and having its outer end exposed and formed with a flange 50 for the mounting of a rubber-tired rear traction wheel 51. The inner said bearing 47 fits in a mating opening provided in the inner wall 16 of the chain case and is secured in place by bolts 52. The outer bearing 48 fits in and is bolted to a plate 53, and this plate, which is removably secured by bolts 54 to the outer wall 17 of the chain case, additionally provides a bearing socket 38 for the outer end 39 of the hub 41. A chain 55 passes the drive from sprocket wheel 42 to sprocket wheel 43, the ratios being such as to provide a 2 to 1 reduction giving to the traction wheel a speed in point of its R. P. M. one-half that of the stub drive shaft 10. From the sprocket wheel 44 a chain 56 passes the drive forwardly to a sprocket wheel 57 carried by a hub 58 which is keyed or otherwise secured to a front axle 60. Like the rear axle, the front axle is journaled in bearing boxes 61 and 62 and a rubber-tired front traction wheel 63 is mounted on the outer exposed end. Said inner and outer bearings 61 and 62 each are fitted in and bolted, as at 64, to a respective plate, as 65 and 66, and each of these plates presents a cylindrical neck arranged to fit in a mating opening provided by the inner or the outer wall, as the case may be, of the chain case, being secured to the chain case by bolts 67 spaced equidistantly about the circumference. Such openings are co-axially placed as between the inner and outer said wall, and the two bearings which the plates carry are co-axial with one another but are eccentric to the perimeters of the plates, thus providing a simple means by which to shift the front axle in order to take up slack in the chain.

It will be apparent from the foregoing that the present invention enables a crawler-type tractor such, for example, as the indicated "International TD-6" to be converted to wheeled traction at moderate expense and in a comparatively short period of time, and without, in so doing, altering the basic structure of the original machine in any way which would later preclude the tractor from being easily and expeditiously re-converted to crawler traction if such should be desired. The converted machine is enabled to travel freely upon the highways which, in most instances, bar any crawler tractor equipped with metal tracks. The converted machine is easily steered through the instrumentality of letting in the clutches and/or braking the two sides selectively, and it will be seen that each of the four wheels are power-driven in assuring effective traction.

While the drawings portray the invention as it is practiced in the conversion of one particular model of one manufacturer's products, the teachings of the invention self-evidently lend themselves to the conversion of other makes and models of crawler tractors. No limitations are to be implied, it being my intention that the hereto annexed claims be given the broadest interpretation to which the employed language fairly admits.

What I claim, is:

1. In the conversion, from crawler to wheeled traction, of a tractor of the described character having a frame and a pair of engine-driven jack-shafts clutch and brake controlled independently of one another and journaled to turn about a coinciding transverse axis adjacent the rear end of the frame with their outer ends projecting laterally beyond the side edges of said frame, a respective elongated chain case for each side of the tractor secured to said main frame so as to occupy fixed positions alongside the latter, the projecting ends of said jack-shafts extending into said chain cases, a driving sprocket wheel fast to the outer end of a respective said jack-shaft to occupy a housed position within the related chain case, respective longitudinally spaced apart front and rear axles journaled in each of the chain cases to the front of the related jack-shaft and with their outer ends exposed outside the chain cases for the mounting of a respective traction wheel, a pair of sprocket wheels fast to each rear axle and a single sprocket wheel fast to each front axle to occupy housed positions within the related chain case, and a pair of transfer chains also housed in a respective said chain case one passing the drive from the driving sprocket wheel to one of the two sprocket wheels fast to the rear axle and the other passing the drive from the other of the two sprocket wheels fast to the rear axle to the sprocket wheel fast to the front axle, the several said sprocket wheels being of such relative size as to give a reduced speed in passing the drive forwardly from the jack-shaft to the rear axle and to give the same speed in passing the drive forwardly from said rear axle to the front axle, the means by which the rear end of each chain case is secured to the frame comprising a respective bracket welded to the chain case and rigidly bolted to the main frame.

2. In the conversion, from crawler to wheeled traction, of a tractor of the described character having a main frame, a respective open-end final-driving housing projecting laterally beyond the frame at each side of the latter adjacent the rear end of the frame, and a respective engine-driven jack-shaft independently clutch and brake controlled journaled in each of said final-drive housings with its outer end projecting laterally beyond the housing, an elongated chain case for each side of the tractor having its rear end rigidly bolted against the open end of the related final-drive housing and having fast to its front end a means rigidly bolted to the main frame, the projecting ends of said jack-shafts extending into said chain cases, respective front and rear axles journaled in each of the chain cases in positions spaced longitudinally one from the other and from the related jack-shaft and with their outer ends exposed outside the chain case for the mounting of a respective traction wheel, sprocket wheels fast to said front axle, said rear axle, and said jack-shaft within each chain case, and transfer chains also housed in each of the chain cases passing the drive through said sprocket wheels from the related jack-shaft to both the related front axle and the related rear axle.

3. Structure according to claim 2 in which the means bolted to the main frame comprises a rigid tie extending transversely across the front end of the tractor from the chain case at one side to the chain case at the other side with its intermediate portion bolted to the main frame.

4. Structure according to claim 3 in which the chain cases are also secured to the main frame at a point approximately central to the length of the chain cases, the means therefor comprising a rigid tie extending transversely of the tractor below the main frame from the chain case at one side to the chain case at the other side and bolted at its ends to the related chain case and intermediate its ends to the main frame.

5. In the conversion, from crawler to wheeled traction, of a tractor of the described character having a frame and a pair of engine-driven jack-shafts clutch and brake controlled independently of one another and journaled to turn about a coinciding transverse axis adjacent to the rear end of the frame with their outer ends projecting laterally beyond the side edges of said frame, a respective elongated chain case for each side of the tractor secured to said main frame so as to occupy fixed positions alongside the latter, the projecting ends of said jack-shafts extending into said chain cases, a driving sprocket wheel fast to the outer end of a respective said jack-shaft to occupy a housed position within the related chain case, respective longitudinally spaced apart front and rear axles journaled in each of the chain cases to the front of the related jack-shaft and with their outer ends exposed outside the chain cases for the mounting of a respective traction wheel, a pair of sprocket wheels fast to each rear axle and a single sprocket wheel fast to each front axle to occupy housed positions within the related chain case, and a pair of transfer chains also housed in a respective said chain case one passing the drive from the driving sprocket wheel to one of the two sprocket wheels fast to the rear axle and the other passing the drive from the other of the two sprocket wheels fast to the rear axle to the sprocket wheel fast to the front axle, the several said sprocket wheels being of such relative size as to give a reduced speed in passing the drive forwardly from the jack-shaft to the rear axle and to give the same speed in passing the drive forwardly from said rear axle to the front axle, the means by which the center part of each chain case is secured to the frame comprising a respective bracket welded to the chain case and rigidly bolted to the main frame, and a complementing tie extending transversely of the tractor below the main frame from the bracket at one side to the bracket at the other side of the tractor, said tie having its ends bolted to the brackets and being bolted intermediate its ends to the main frame.

6. In the conversion, from crawler to wheeled traction, of a tractor of the described character having a frame and a pair of engine-driven jack-shafts clutch and brake controlled independently of one another and journaled to turn about a coinciding transverse axis adjacent the rear end of the frame with their outer ends projecting laterally beyond the side edges of said frame, a respective elongated chain case for each side of the tractor secured to said main frame so as to occupy fixed positions alongside the latter, the projecting ends of said jack-shafts extending into said chain cases, a driving sprocket wheel fast to the outer end of a respective said jack-shaft to occupy a housed position within the related chain case, respective longitudinally spaced apart front and rear axles journaled in each of the chain cases to the front of the related jack-shaft and with their outer ends exposed outside the chain cases for the mounting of a respective traction wheel, a pair of sprocket wheels fast to each rear axle and a single sprocket wheel fast to each front axle to occupy housed positions within the related chain case, and a pair of transfer chains also housed in a respective said chain case one passing the drive from the driving sprocket wheel to one of the two sprocket wheels fast to the rear axle and the other passing the drive from the other of the two sprocket wheels fast to the rear axle to the sprocket wheel fast to the front axle, the several said sprocket wheels being of such relative size as to give a reduced speed in passing the drive forwardly from the jack-shaft to the rear axle and to give the same speed in passing the drive forwardly from said rear axle to the front axle, the means by which the front end of each chain case is secured to the frame comprising a tie extending transversely across the front end of the tractor from the chain case at one side to the chain case at the other side with its two ends rigidly bolted to the chain cases and its intermediate portion rigidly bolted to the main frame.

7. In the conversion, from crawler to wheeled traction, of a tractor of the described character having a frame and a pair of engine-driven jack-shafts clutch and brake controlled independently of one another and journaled to turn about a coinciding transverse axis adjacent the rear end of the frame with their outer ends projecting laterally beyond the frame and beyond a respective housing section for said jack-shafts, a respective elongated chain case for each side of the tractor secured to said main frame so as to occupy fixed positions alongside the latter, the projecting ends of said jack-shafts extending into said chain cases, a driving sprocket wheel fast to the outer end of a respective said jack-shaft to occupy a housed position within the related chain case, respective longitudinally spaced apart front and rear axles journaled in each of the chain cases to the front of the related jack-shaft and with their outer ends exposed outside the chain cases for the mounting of a respective traction wheel, a pair of sprocket wheels fast to each rear axle and a single sprocket wheel fast to each front axle to occupy housed positions within the related chain case, and a pair of transfer chains also housed in a respective said chain case one passing the drive from the driving sprocket wheel to one of the two sprocket wheels fast to the rear axle and the other passing the drive from the other of the two sprocket wheels fast to the rear axle to the sprocket wheel fast to the front axle, the several said sprocket wheels being of such relative size as to give a reduced speed in passing the drive forwardly from the jack-shaft to the rear axle and to give the same speed in passing the drive forwardly from said rear axle to the front axle, said chain cases being boltably secured to said housing sections.

References Cited in the file of this patent

UNITED STATES PATENTS

| | | |
|---|---|---|
| 1,253,319 | White | Jan. 15, 1918 |
| 1,330,697 | Franklin | Feb. 10, 1920 |
| 1,455,616 | Hodgkiss | May 15, 1923 |
| 1,497,327 | Childers | June 10, 1924 |
| 1,606,707 | Johnston et al. | Nov. 9, 1926 |
| 1,741,425 | Masury | Dec. 31, 1929 |
| 2,280,741 | Bolster et al. | Apr. 21, 1942 |
| 2,311,922 | Allin | Feb. 23, 1943 |
| 2,352,593 | Allin | July 4, 1944 |
| 2,362,068 | Hollmann et al. | Nov. 7, 1944 |
| 2,415,596 | Larison | Feb. 11, 1947 |
| 2,427,470 | Morton et al. | Sept. 16, 1947 |
| 2,434,693 | Graham | Jan. 20, 1948 |
| 2,554,785 | Leliter | May 29, 1951 |
| 2,691,553 | Pettigrew | Oct. 12, 1954 |

FOREIGN PATENTS

| | | |
|---|---|---|
| 961,585 | France | Nov. 21, 1949 |
| 252,847 | Great Britain | June 10, 1926 |